United States Patent
Bernardo de Oliveira et al.

(10) Patent No.: US 9,491,060 B1
(45) Date of Patent: Nov. 8, 2016

(54) INTEGRATED WIRELESS SENSOR NETWORK (WSN) AND MASSIVELY PARALLEL PROCESSING DATABASE MANAGEMENT SYSTEM (MPP DBMS)

(71) Applicant: EMC Corporation, Hopkinton, MA (US)

(72) Inventors: Ana Cristina Bernardo de Oliveira, Rio de Janeiro (BR); Flavia Coimbra Delicato, Rio de Janeiro (BR); Paulo de Figueiredo Pires, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 77 days.

(21) Appl. No.: 14/318,806

(22) Filed: Jun. 30, 2014

(51) Int. Cl.
*H04L 12/24* (2006.01)
*H04L 12/26* (2006.01)

(52) U.S. Cl.
CPC ............ *H04L 41/142* (2013.01); *H04L 41/12* (2013.01); *H04L 43/14* (2013.01)

(58) Field of Classification Search
CPC ............... H04W 4/005; H04W 84/18; H04L 29/08558; H04L 41/04; H04L 41/085–41/0856; H04L 67/12
See application file for complete search history.

(56) References Cited

U.S. PATENT DOCUMENTS

| 2006/0146776 | A1* | 7/2006 | Kim ............... B25J 9/1602 370/338 |
| 2006/0212570 | A1* | 9/2006 | Aritsuka ............ G06F 21/554 709/224 |
| 2009/0252087 | A1* | 10/2009 | Jiang ............... H04W 4/02 370/328 |
| 2012/0109888 | A1* | 5/2012 | Zhang ............ G06F 17/30584 707/610 |
| 2013/0282149 | A1* | 10/2013 | Kuntagod ............ H04L 67/12 700/73 |

* cited by examiner

*Primary Examiner* — Pao Sinkantarakorn
(74) *Attorney, Agent, or Firm* — Ryan, Mason & Lewis, LLP (57) ABSTRACT

An architecture, methods and apparatus are provided for managing sensor data. Sensor networks comprised of a plurality of sensors are managed by obtaining measurement data and context data from the plurality of sensors; storing the obtained measurement data and context data using a Massively Parallel Processing Database Management System (MPP DBMS); and managing the sensor network from outside of the sensor network using the MPP DBMS. Context-aware adaptation of sensors is based on context regarding a state of the sensor network and context regarding a state of one or more applications. The sensor nodes are optionally clustered based on semantic similarities among sensor readings from different sensor nodes and a distance among the sensor nodes. A subset of the sensor nodes is optionally selected to be active based on a residual energy of the sensor nodes and a relevance of the sensor nodes to an application. Data prediction models are generated and employed for data sensing and analytics.

25 Claims, 8 Drawing Sheets

INTEGRATED WIRELESS SENSOR NETWORK (WSN) AND MASSIVELY PARALLEL PROCESSING DATABASE MANAGEMENT SYSTEM (MPP DBMS)

FIELD

The field relates generally to the management of sensor data.

BACKGROUND

Sensor devices of various types are increasingly common, producing a large amount of information regarding diverse physical variables. Such information is useful for a wide range of applications, such as surveillance, habitat monitoring, target tracking, factory control, structural health monitoring, assisted living, pipeline integrity and tank level monitoring. With recent advances in microelectronics and wireless communication techniques, current sensors are full-fledged computer systems, typically comprising a central processing unit (CPU), main memory, operating system and radio interfaces.

A promising solution for applications based on sensing data is to employ a set of sensors and interconnect them via radio links to compose a wireless sensor network (WSN). Such networks provide a powerful distributed data acquisition system. Sensor nodes act in a collaborative way to perform sensing tasks providing data with scale. The use of wireless communications enables the configuration and reconfiguration of sensors installed in an easy, fast and inexpensive way. Individual sensor readings, however, are subject to environmental noise and inaccuracies that can affect the data quality. In addition, since sensors are typically operated by non-rechargeable batteries, it is essential to optimize sensing and communication tasks in order to extend the operational lifetime of the network. In this context, extracting useful information from the myriad of sensor-collected data in order to meet high-level goals of applications in a timely manner requires a large development effort and presents several research challenges involving data analytics and optimization techniques in order to provide high quality information while dealing with constraints and specific features of WSN. These unique features naturally motivate the involvement of autonomic capabilities in WSNs.

The fundamental characteristic of an autonomic system is self-management, meaning the ability to perform routine tasks such as configuration and maintenance without the intervention of the human system administrator. The system must be continuously self-monitored to be aware of changes in the execution environment, which may require some reconfiguration and optimization of components in order to protect against a suspected faulty or inefficient behavior or to recover from failures. Therefore, an autonomic system must be provided with context aware adaptation capabilities. Context can be defined as any information that can be used to characterize the situation of an entity, where the entity can be a person, place, or object that is considered relevant to the interaction between the user and the entity, including itself and users. In the WSN scenario, context refers to the state of the network (including the devices and the connectivity between them) and of the application.

A need exists for an improved architecture and processes for managing sensor data.

SUMMARY

Illustrative embodiments of the present invention provide an architecture, methods and apparatus for managing sensor data. In one exemplary embodiment, at least one sensor network comprised of a plurality of sensors is managed by obtaining measurement data and context data from the plurality of sensors; storing the obtained measurement data and context data using a Massively Parallel Processing Database Management System (MPP DBMS); and managing the at least one sensor network from outside of the at least one sensor network using the MPP DBMS.

According to one aspect of the invention, the at least one sensor network is managed using a context-aware adaptation of one or more sensors in the at least one sensor network based on context regarding a state of the at least one sensor network and context regarding a state of one or more applications. The management of the sensor network comprises, for example, adjusting a behavior of one or more elements of the sensor network and/or evaluating a data quality of the obtained measurement data relative to one or more predefined percentages of error.

According to another aspect of the invention, the sensor nodes are clustered based on semantic similarities among sensor readings from the different sensor nodes and a distance among the sensor nodes. A subset of the sensor nodes is optionally selected to be active based on a residual energy of the sensor nodes and a relevance of the sensor nodes to at least one application.

According to yet another aspect of the invention, one or more data prediction models are generated that allow one or more of obtaining sensing data with a reduced number of sensors, processing one or more queries when a portion of the sensed data is unavailable and extrapolating current data to predict future data.

An architecture design is also provided of the logical components (and their relationships) that will realize the disclosed methods, and then will be transformed into the tangible software components (i.e., a product to be implemented).

Advantageously, illustrative embodiments of the invention provide management of sensor data. These and other features and advantages of the present invention will become more readily apparent from the accompanying drawings and the following detailed description.

DETAILED DESCRIPTION

Illustrative embodiments of the present invention will be described herein with reference to exemplary communication, storage and processing devices. It is to be appreciated, however, that the invention is not restricted to use with the particular illustrative configurations shown. Aspects of the present invention provide an architecture and a process for managing sensor data. As used herein, an architecture comprises a design of the logical components (and their relationships)—an intangible structure—that will realize/materialize the proposed methods, and then will be transformed into the tangible software components (i.e., a product to be implemented). Such architecture is independent of the concrete software implementation, as it is at a higher level of abstraction.

The disclosed techniques improve the quality of information provided to an application while optimizing the use of the available sensing and communication resources. To achieve this goal, a data-centric architecture is employed for sensor networks based on the principles of autonomic computing to integrate sensory data acquisition systems with a Massively Parallel Processing Database Management System (MPP DBMS) and a set of prediction models. According to one aspect of the invention, an automated process is provided for sensor network configuration and adaptation, with an emphasis on data quality and optimization of resources. According to another aspect of the invention, data prediction models are integrated with the disclosed reference architecture.

Importance of Autonomic Computing in WSNs

Initially, it should be considered that a WSN may have mobile nodes, the monitored phenomenon can be mobile, or even the virtual network topology can change dynamically due to inactivity cycles of nodes (for the purpose of energy conservation). Self-configuring WSNs can set up network connections, assess whether there are gaps in the network connectivity, and replace a node that has moved, was turned off or is "dead" on the network. Since sensors can be deployed in a remote area (e.g., a forest or in the middle of the ocean) or in physically inaccessible places (e.g., inside a wall of a building or a ship tank), they are required to operate with minimum human support. Although most existing WSN applications consider this requirement in the design of the network, there is still a need for the network to be able to properly reconfigure and recover with limited human intervention, especially in large scale networks.

Sensor readings usually contain a degree of noise, which can cause false positives readings due to malfunctioning sensors. It is necessary that the sensors have the ability to collectively self-heal the network (i.e., detect and eliminate malfunctioning sensors) to avoid false positive readings. Such detection and elimination of false positives should preferably be done within the nodes themselves (avoiding the transmission of noisy data to the sinks or base stations) or at the sink nodes, before the delivery of data to end user or client applications.

Sensor nodes are usually exposed to harsher conditions than traditional computing equipment, and are therefore subject to depletion of energy and accidental damage. Battery failure can result in loss of sensor nodes, leading to a gradual degradation of the network. Network paths can be broken and gaps may appear in the sensing coverage area. A WSN needs to adapt to changes, recover from losses, and protect itself from the adverse conditions. This can be achieved through renegotiation of routes in the network by monitoring the voltage levels in sensor nodes, controlling each node or set of nodes by software agents or by the base station and, on the occurrence of failures, by activating redundant nodes to replace damaged or informing any higher level entity that can provide assistance and take appropriate actions.

Another key point is that maximum efficiency needs to be obtained from the available energy, since the available energy at each sensor node is limited. Activities of sensing, processing and data transfer are energy intensive, so that each node must be able to sense, process and transfer data effectively. Therefore, self-optimization is an important characteristic for operation in any WSN. The energy savings can be achieved by placing the nodes in a dormant (inactive) low power state, ready to be reactivated when needed, but always without compromising the quality desired by the application. For example, sensors can reduce their work cycle whenever there is no significant change in their readings, resulting in lower energy consumption.

To summarize, all basic principles of self-management and adaptation in WSNs are in accordance with the concept of autonomic computing. Therefore, aspects of the present invention recognize that the principles of autonomic computing can be applied to wireless sensor networks in order to optimize the use of network resources, facilitate their operations and achieve the desired functionality in the broad and growing field of sensing-based applications.

WSN Management

The typical operation of a WSN involves several stages, including the physical deployment of the sensor nodes in the target area, the construction of the code that will run inside of the nodes to accomplish the sensing tasks, and the submission of various types of queries made by the client application or end users. In all of these stages, it is necessary to manage how data will be collected, transmitted and processed in order to meet the application requirements, including the quality of data provided, and the efficient use of the limited resources of the network. Therefore, it is necessary to provide solutions for efficient and reliable data management. Moreover, data management functions should be performed in an autonomous way.

Sensor data management supports the collection, analysis, integration and use of sensed data, and is challenging for a range of reasons. First, the sensed data must provide sufficient quality data for applications, given their specific requirements. In addition, the WSN operation must be adapted in a context aware way, where context refers to the application requirements and the network state. Further, it is important to define a "best possible" configuration of the network and nodes at design time and operate the network in an energy efficient way.

In order to achieve self-management, systems implement the following four exemplary key characteristics:
  Self-configuration: ability to adapt to the environment itself by making changes according to high-level policies, aligned with business goals and defined by system administrators;
  Self-healing: ability to recover after a system disturbance and to minimize interruptions in order to maintain the software system available to the user, even in the presence of individual component failures;

Self-protection: ability to predict, detect, recognize, and protect against malicious attacks and unintended cascading failures;

Self-optimization: ability to continuously improve system operation.

Figure 1:
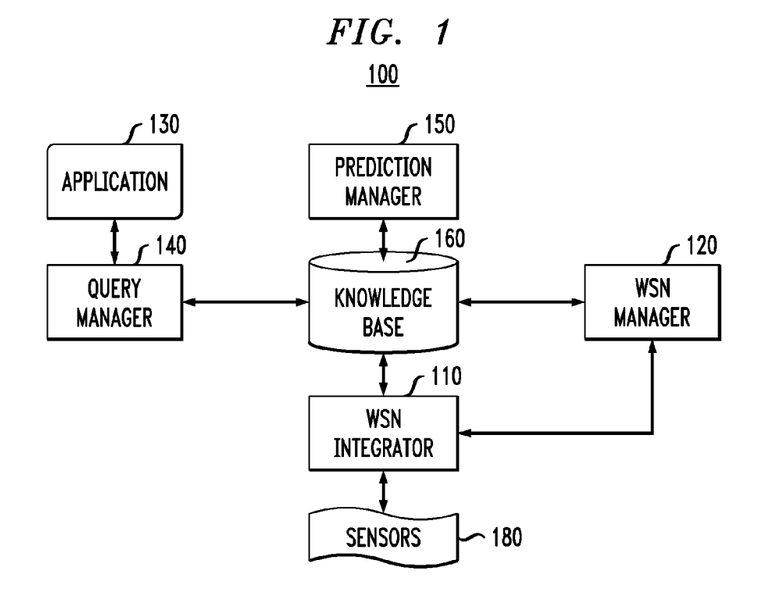
FIG. 1 illustrates an exemplary architecture for a WSN in accordance with aspects of the present invention.

FIG. 1 illustrates an exemplary architecture 100 for a WSN in accordance with aspects of the present invention. As shown in FIG. 1, the exemplary architecture 100 comprises a WSN integrator 110, a WSN manager 120, an application 130, a query manager 140, a prediction manager 150, a knowledge base 160 and a plurality of sensors 180. While aspects of the present invention are illustrated herein the context of wireless sensor networks, aspects of the present invention are also applicable to wired sensor networks as well, as would be apparent to a person of ordinary skill in the art.

According to one aspect of the invention, the management of the WSN is performed outside of the WSN using the knowledge base 160. The knowledge base 160 can be embodied, for example, as an MPP DBMS. MPP architectures typically comprise a plurality of independent processors or servers operating in parallel. Aspects of the present invention thus provide an architecture and associated automated process to augment the MPP DBMS 160 with mechanisms to manage data collected by WSNs in an efficient and reliable way. The use of an MPP database is important to deal with the data collected from a large number of sensors and also to allow the continuous evaluation of prediction models.

The exemplary architecture 100 was inspired by the concepts of autonomic computing, since the search for an autonomous and dynamically adaptive behavior is one of the requirements of large scale sensor networks. In order to take advantage of a platform for highly parallel data processing provided by an MPP DBMS and continuously provide high quality data to the end user, the architecture 100 enables the integration of data prediction and data analytics models as part of its components.

According to another aspect of the invention, a data-centric architecture is provided that is focused on the integration of data acquisition components, parallel processing systems and data prediction models. Such integration will enable features not possible in currently existing sensor network architectures, namely:

1. Robust, continuous and accurate data acquisition even in presence of faults in individual sensor nodes;
2. Sophisticated analyses and queries over the collected raw data so as to meet high level requirements defined by the end users; and
3. Optimization of network resources so as to extend its useful lifetime as a distributed data acquisition system.

Figure 2:
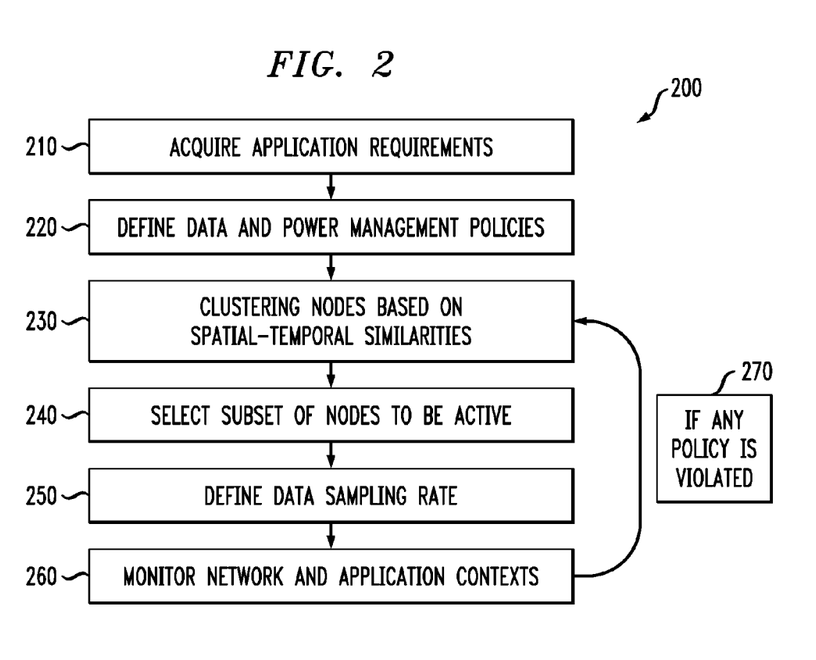
FIG. 2 is a flow chart illustrating an exemplary implementation of a WSN management process incorporating aspects of the invention.

FIG. 2 is a flow chart illustrating an exemplary implementation of a WSN management process 200. Generally, the exemplary WSN management process 200 provides an automated process for managing and operating the WSN system. Among other benefits, the exemplary WSN management process 200 optimizes the resources of the WSN and ensures the data quality of the sensed data. For example, the exemplary WSN management process 200 can ensure that the error rate does not exceed a specified target error rate.

The exemplary WSN management process 200 represents the autonomous behavior of the specified architectural components and guides the operation of the data acquisition and processing based on high level goals defined by the end user and the system manager for providing high quality data and resources optimization. As shown in FIG. 2 and discussed further below, the exemplary WSN management process 200 comprises a set of configuration and adaptation steps along with associated algorithms and procedures to adjust the behavior of the architecture components and network operation. Moreover, with the support of the underlying architecture, the system operates with reduced human intervention relative to conventional approaches, taking into account the high-level goals initially set.

As shown in FIG. 2, the exemplary WSN management process 200 initially acquires the requirements of the application 130 during step 210. Thereafter, the WSN management process 200 defines the data and power management policies during step 220. The sensor nodes 180 in the WSN are then clustered during step 230 based on spatial-temporal similarities.

A subset of the sensor nodes 180 are then selected to be active during step 240. A data sampling rate is defined during step 250, and the WSN and application contexts are monitored during step 260. The exemplary WSN management process 200 monitors if any policy is violated during step 270.

The exemplary autonomic computing model described herein provides conceptual guidelines on the design of self-managed systems. In practice, this information model needs to be mapped to an implementable architecture. Specifically, measurement and monitoring techniques, inference and rules engines, planning methodologies, dynamic resource allocation techniques, and management schemes need to be developed for autonomic elements, and a platform for scalable management are needed to coordinate autonomic elements in a self-managed adaptive WSN system.

There are several approaches to develop self-adaptive systems, such as the framework for autonomic computing proposed by IBM® for self-managing IT systems. See, for example, J. O. Kephart and D. M. Chess, "The Vision of Autonomic Computing," Computer 36:41 (2003), incorporated by reference herein. In the IBM® framework, a self-adaptive system is a collection of autonomic elements where each element comprises an autonomic manager and a resource manager. The autonomic manager allows adaptation through four activities: monitoring, analyzing, planning and executing, with support from a knowledge base. These elements are known as MAPE-K (Monitor, Analyze, Plan, Execute and Knowledge Base). In the Monitoring activity, relevant data is collected via sensors to reflect the current state of the system (thus granting context awareness). In the Analyzing activity, collected data is analyzed in search of symptoms relating the current and desired behavior. The Planning activity decides whether it is necessary to adapt the system to address the goals previously defined. In the Execution activity, the desired adaptation is carried out in the system by actuators or effectors. Feedback control loops are considered an important issue in pursuing self-adaptation for any system, because they support the four above-mentioned processes. Feedback control loops play an integral role in adaptation decisions. Thus, key decisions about a self-adaptive system's control depend on the structure of the system and the complexity of the adaptation goals. Control loops can be composed in series, parallel, multi-level (hierarchical), nested, or independent patterns. Also, systems can change parameters, representations, and resource allocations, choose among pre-constructed components and connectors, synthesize new components and connectors, and augment the system with new sensors and actuators.

In the exemplary architecture 100 for self-adaptive WSNs described herein, the interactions among the different phases of control loops realized by the MAPE-K components are considered, and such components are adapted for the context of a data acquisition system integrated with an MPP DB. The managed system is the WSN, encompassing the nodes and links. The core of the autonomic manager is an MPP DB in the knowledge base 160 and a set of software components and data prediction models.

Figure 3:
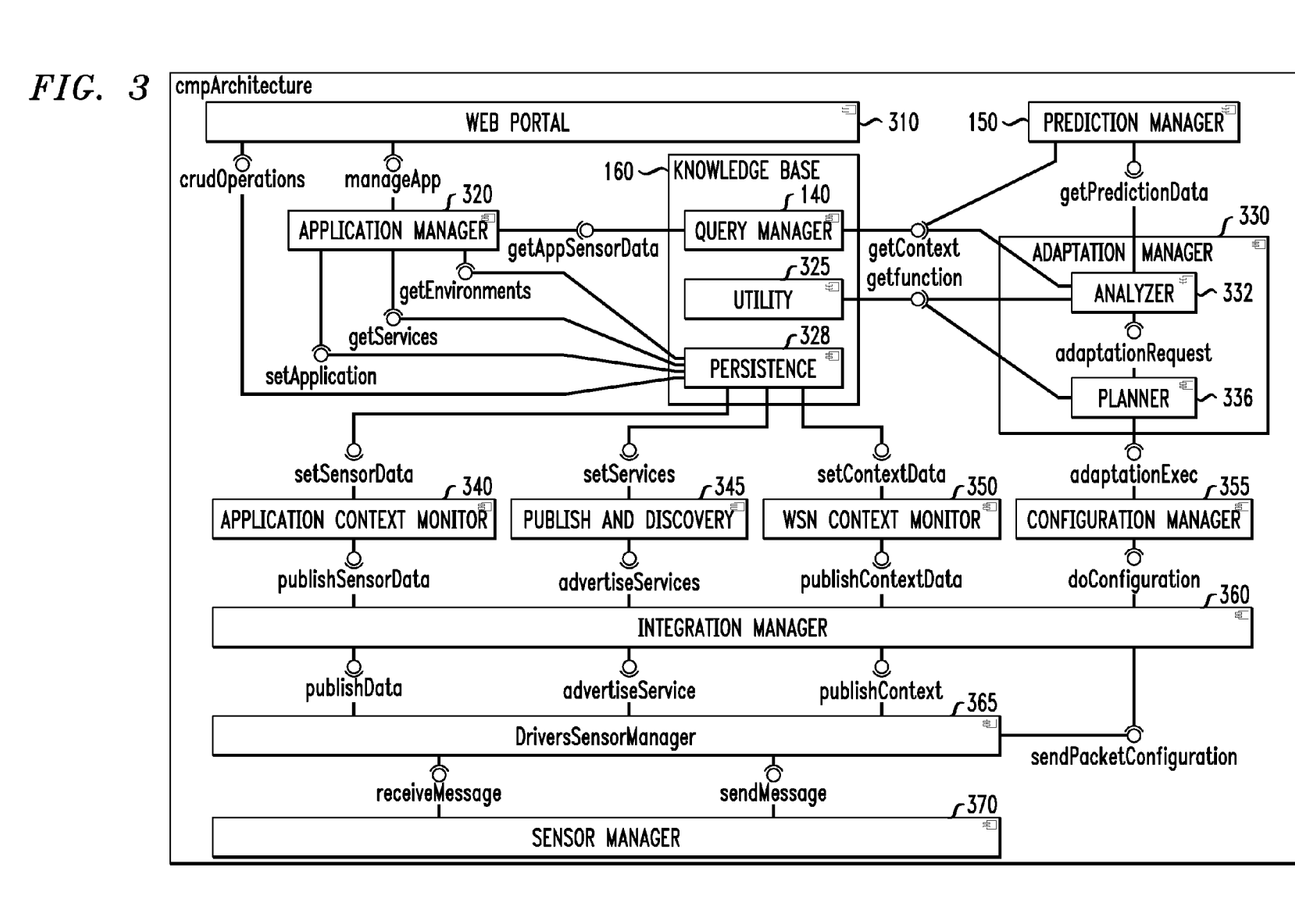
FIG. 3 is a Unified Modeling Language (UML) component diagram illustrating the autonomous aspects of the abstract architecture of FIG. 1 in further detail.

FIG. 3 is a Unified Modeling Language (UML) component diagram illustrating the autonomous aspects of the abstract architecture 100 of FIG. 1 in further detail. Generally, FIG. 3 illustrates the structural relationships between the various components of a system. In FIG. 3, rectangles represent the components of the architecture. A component has "provided" and "required" interfaces. In the notation of FIG. 3, the interface symbols with a complete circle at their end represent an interface that the component "provides," while interface symbols with only a half circle at their end represent an interface that the component "requires" (in both cases, the name of the interface is placed near the interface symbol itself).

The WSN Integrator element 110 of FIG. 1 is shown in FIG. 3 as three distinct components: Sensor Manager 370, DriversSensorManager 365 and Integration Manager 360. The Sensor Manager 370 component directly interacts with the API of the operating system of the sensor nodes 180 and configures the sensor nodes 180 according to the sensing tasks and quality of service (QoS) parameters required by applications and received from the Integration Manager module 360. The Sensor Manager 370 receives measurement data and context data from the sensors 180. The DriversSensorManager 365 encompasses the drivers for different sensor platforms that enable the communication between different WSNs and the Integration Manager module 360. The Integration Manager 360 provides the integration of different WSNs with the other modules of the architecture. The Integration Manager 360 forwards configuration messages to sensor nodes 180 and receives context and data messages from sensor nodes 180.

The WSN Manager element 120 of FIG. 1 is shown in FIG. 3 as five distinct components: Adaptation Manager 330, Application Context Monitor module 340, Publish and Discovery component 345, WSN Context Monitor module 350 and Configuration Manager module 355. The Publish and Discovery component 345 provides the functionalities that allow WSNs to advertise the services provided by them. As used herein, "service" means the capability of performing a given sensing task, for instance, to measure temperature in the environment, to detect an event of fire, etc. The information about each WSN provided service (its capability) is stored in the Knowledge Base Module 160. The Application Context Monitor module 340 is responsible for receiving messages containing data generated by sensor nodes and sending such messages to be stored in the Knowledge Base Module 160. Such data represents the application context. The WSN Context Monitor module 350 is responsible for receiving messages containing information related to WSN context such as current topology, residual energy of nodes, node operation mode and duty cycle, among others. The content of such messages are stored in the Knowledge Base Module 160. The Configuration Manager module 355 is responsible for receiving commands from the Adaptation Manager 330 to configure and reconfigure WSN nodes 180 and sending such commands to the Integration Manager 360 that in turns forwards them to the WSN using the interface of the Sensor Manager 370. The Adaptation Manager 330 provides features that allow the adaptation of the network and is composed of an Analyzer component 332 and a Planner component 336. The Analyzer 332 periodically scans the Knowledge Base 160 to extract information about the current context (of network and application(s)) and generates adaptation events when adaptation is required, sending them to the Planner 336. Upon receiving an adaptation event, the Planner 336 determines the adaptation action to be taken according to these events, the current state of the WSN, and the rules and policies defined in the system and stored in the Knowledge Base 160. The actions are translated into configuration messages to be sent to the sensor nodes through the Configuration Manager 355.

The Knowledge Base module 160 encompasses the system repositories to store data and metadata, including information about: sensor networks, applications, policies, rules and adaptation strategies. The Knowledge Base module 160 also provides a communication interface between the database and the other modules of the architecture 100. The exemplary Knowledge Base module 160 is implemented using an MPP database and it encompasses three components: a Query Manager 140, Utility 325, and Persistence 328. The Query Manager 140 is responsible for processing complex queries requested by the other system components. The utility component 325 is responsible for managing models and algorithms needed for the operation of the other components. The persistence component 328 provides a communication interface between the database 160 and the other modules of the system.

The Prediction Manager component 150 is responsible for building an abstraction of the sensed phenomenon based on historical data produced by the WSNs measurements registered in the System, as discussed further below. In addition, the Prediction Manager component 150 looks for similarities among the clusters of sensors.

Finally, the Application Manager component 320 along with the Web Portal component 310 provide the user interface to interact with the system. The Application Manager component 320 and Web Portal component 310 represent the Application element application 130 of FIG. 1.

Network Configuration and Adaptation for Data Quality and Optimized Resources

Another aspect of the invention automatically selects the WSN configuration parameters that meet application-specific requirements while reducing the consumption of network resources. The disclosed configuration process 400, as discussed further below in conjunction with FIG. 4, receives as input the description of the sensing task, which is specified by the user and encompasses the following parameters: (i) target area to be monitored (represented either by geographic coordinates or by environments, such as a building, a building floor, an office, etc.), (ii) required number and types of sensor nodes (e.g., spatial resolution), (iii) data sensing and sending rates, (iv) description of relevant events to be notified (for instance, a temperature higher than a threshold in a room, vibration higher than a given value in a monitored structure, presence of smoke or gas leaking, among others), and (v) QoS requirements, such as maximum delay tolerated, minimum data accuracy required, minimum sensing coverage desired, minimum network operational lifetime, among others.

Figure 4:
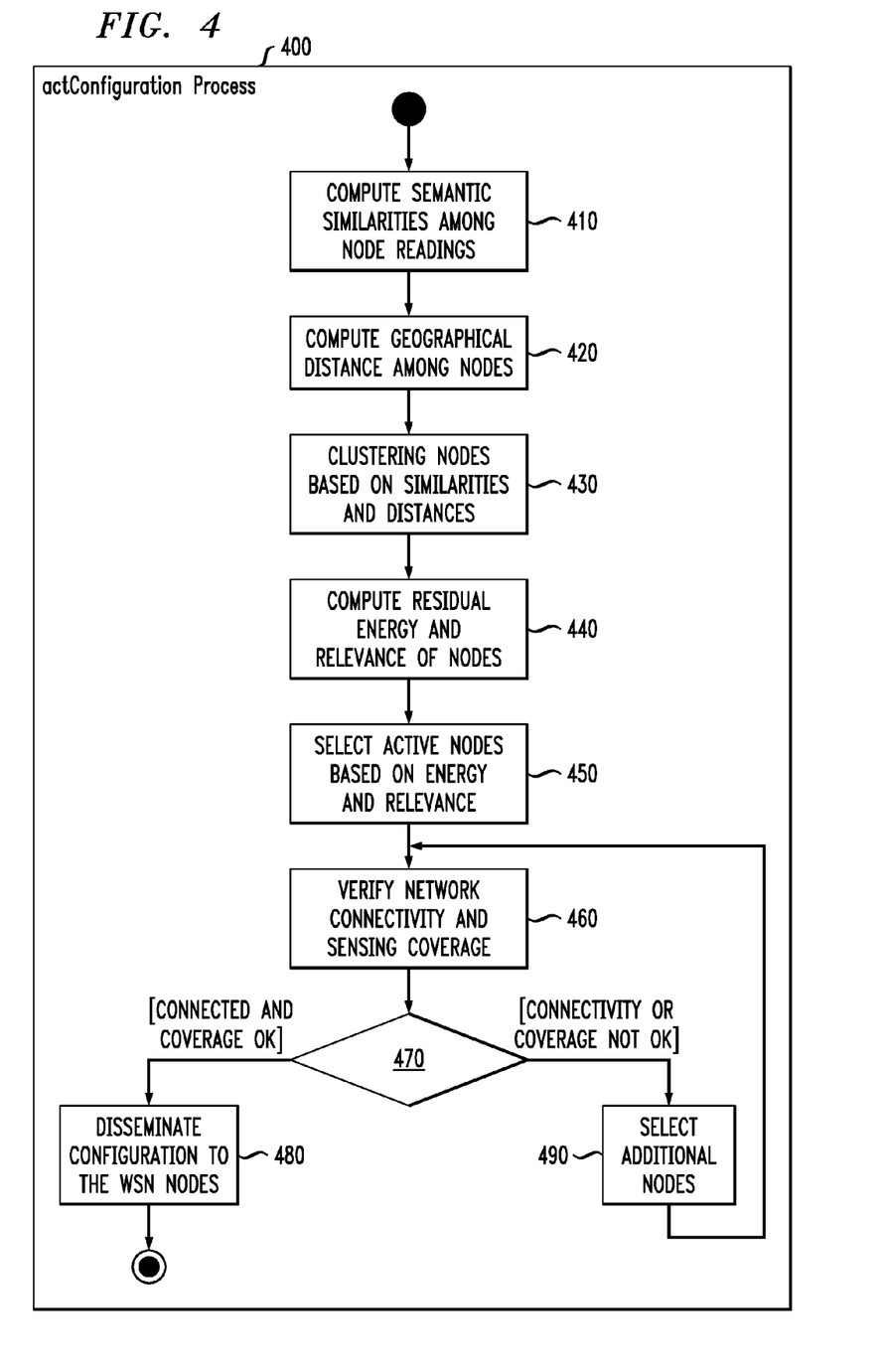
FIG. 4 is a flow chart describing an exemplary implementation of a configuration process incorporating aspects of the invention.

The selection of configuration parameters is important since there are some tradeoffs among different aspects of the network performance, which must be dealt with. For instance, some network level protocols provide lower delays but at the cost of consuming more resources and thus minimizing the network lifetime. Besides, a configuration developed for one particular scenario may have poor performance in a different scenario. In this context, the proposed autonomous process 400 relies on a set of algorithms and a knowledge base 160 kept by the MPP DBMS in order to improve the usage of the WSN resources while guaranteeing the application QoS requirements.

FIG. 4 is a flow chart describing an exemplary implementation of a configuration process 400 incorporating aspects of the invention. As shown in FIG. 4, the exemplary configuration process 400 initially computes semantic similarities among node readings during step 410. The exemplary configuration process 400 then computes the geographical distance among the nodes 180 during step 420 and performs a clustering of nodes 180 during step 430 based on the similarities and distances computed in steps 410 and 420, respectively.

The clustering (grouping) of nodes 180 during step 430 is a technique widely employed in WSN, especially in large scale networks for purposes of energy saving. Nodes 180 that are members of a cluster can collaborate about recent data measurements and determine how much information should be transmitted to the gateway. Moreover, in areas where there are a redundant number of sensors 180, a clustering algorithm can be used to select which nodes better represent data samples for the region and which ones can be put in a power-save mode. The criterion typically considered for grouping nodes in WSN algorithms is the distance between nodes, since grouping nodes located far from each other is not efficient in terms of energy transmission (a major source of consumption in WSN). However, there are other criteria for clustering that can bring benefits in terms of the usage of the network resources and quality of the provided sensing data. The disclosed clustering process 400 takes into account semantic similarities among sensor readings from different nodes 180, in addition to the distance among the nodes 180.

The exemplary configuration process 400 computes a residual energy and relevance of the nodes 180 during step 440, and then selects active nodes based on the computed energy and relevance during step 450. The relevance of the nodes may be computed, for example, by using the proximity of the node to the target region to be monitored (the closer a node is to the region, the more relevant it is), or the number of one-hop neighbors of a given node (the more neighbors an individual node has, it means there is a higher probability that other nodes are able to sense the same characteristics of the monitored environment, so the less relevant is that particular node for the application goals). The selection of active nodes during step 450 for executing the required sensing tasks may optionally also include an assignment of their roles in the network (router/sensor/data aggregator) and a definition of their duty cycles (time during which they are awake or asleep, in a power-save mode). There are several existing algorithms that can be used to select the nodes that must remain active at any given time on the network, so as to take advantage of the typical redundancy of nodes in these networks, for purposes of energy saving. Aspects of the present invention aim to increase the energy efficiency of the network, and also select nodes that potentially provide data with the best quality for the application. See, for example, Flávia Coimbra Delicato et al., "An Efficient Heuristic for Selecting Active Nodes in Wireless Sensor Networks," Computer Networks 50(18): 3701-3720 (2006), incorporated by reference herein.

The node selection algorithm employed by the exemplary configuration process 400 takes into account the residual energy of nodes and their relevance to the application as key factors in their choice as an active node in the network, and implements a set of constraints to guarantee sensing coverage and network connectivity.

The exemplary configuration process 400 verifies the network connectivity and sensing coverage during step 460. For example, the data sensing and sending rates can be established so as to meet the requirements of multiple applications running in the WSN, taking into account the individual requirements of each application 130.

A test is performed during step 470 to determine if the network connectivity and sensing coverage are Ok. If it is determined during step 470 that the network connectivity and sensing coverage are Ok, then the configuration is disseminated to the WSN nodes 180 during step 480. If, however, it is determined during step 470 that the network connectivity and sensing coverage are not OK, then additional nodes are selected during step 490.

The exemplary configuration process 400 generates, for example: (i) network logical topology, (ii) set of active nodes, and (iii) operational mode of active nodes (duty cycle), in order to extend the network lifetime and/or provide accurate sensed data.

If the user defines his/her priority as to balance both the requirements of extending network lifetime and achieving high quality of data, then the exemplary configuration process 400 generates, for example: (i) network logical topology, (ii) set of active nodes, and (iii) operational mode of active nodes (duty cycle), in order to balance the tradeoff between network lifetime and data quality.

In addition to providing the initial configuration for the WSN operation, considering the WSN dynamic execution environment, another aspect of the invention provides a context aware adaptation process 500, as discussed further below in conjunction with FIG. 5, which takes into account two types of context: context regarding the state of the network (nodes and connectivity) and context regarding the state of the running application 130 (or applications).

Figure 5:
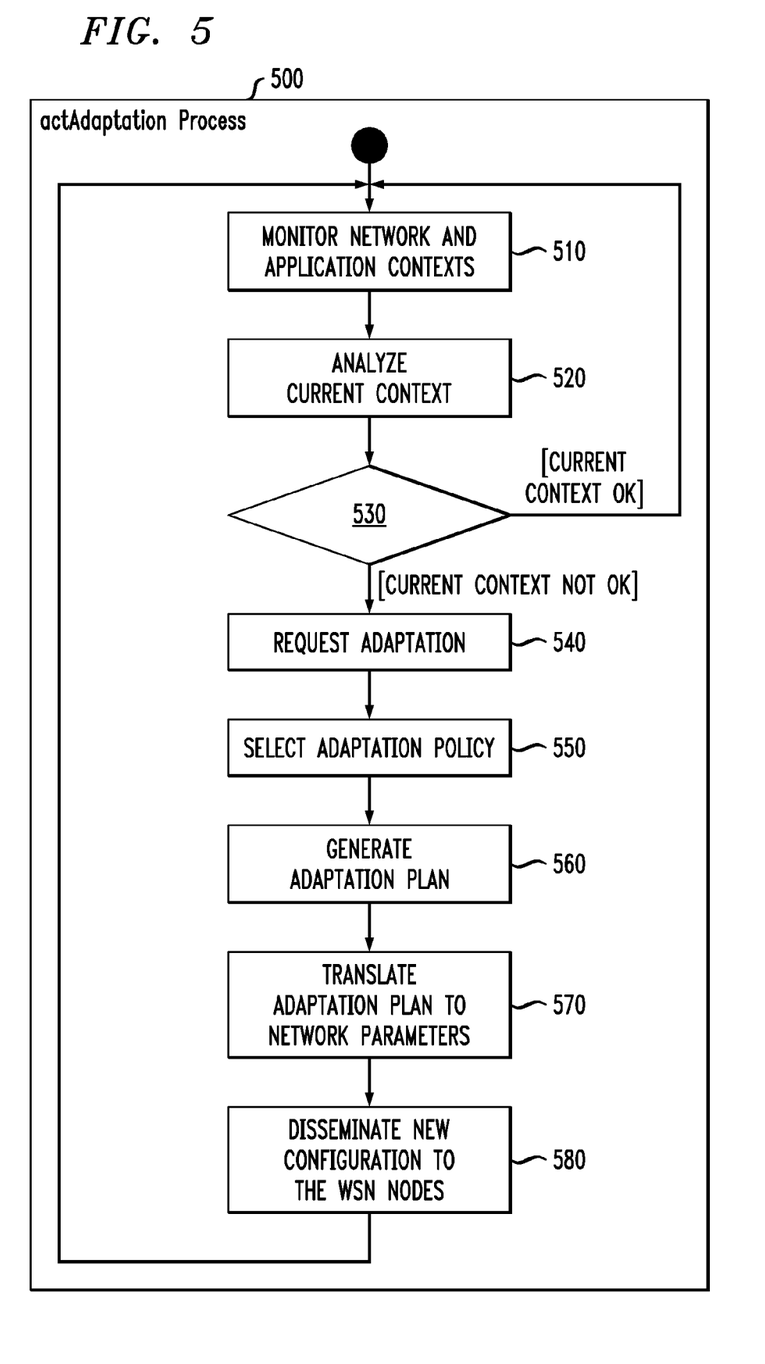
FIG. 5 is a flow chart describing an exemplary implementation of a context aware adaptive process incorporating aspects of the invention.

As shown in FIG. 5, the exemplary context aware adaptive process 500 initially monitors network and application contexts during step 510 and analyzes the current context during step 520. The set of monitored parameters may comprise, for example, residual energy of nodes 18, measurement error of sensor readings, sensing coverage and radio connectivity of active nodes; interval between acquisition and transmission of the sensor measures (sensing and sensing rates), delay and data loss that reflect the current state (context) of the network and application. The values of the monitored parameters can be compared during step 520, for example, with predefined desired values for each parameter, according to the specified application QoS requirements, in order to verify if the network is in a desirable state (or to identify symptoms of possible undesirable states).

A test is performed during step 530 to determine if the Current Context is OK. If it is determined during step 530 that the current context is OK, then program control returns to step 510 to continue monitoring the network and application contexts. If, however, it is determined during step 530 that the current context is not OK, then adaptation of the context is requested during step 540 so as to change the system state towards the desired one.

The exemplary context aware adaptive process 500 consults the knowledge base 160 in search of available strategies and adaptation policies in order to select an adaptation policy during step 550 and generates an adaptation plan during step 560. The adaptation plan is then translated to network parameters during step 570 (for instance, number of active nodes, data sampling rate, and duty cycle of nodes). The new configuration is disseminated to the WSN nodes 180 during step 580.

Consider an application 130 with the following sensing task and QoS requirements: "monitoring temperature and humidity of laboratory A for one month; send the monitored values every hour and notify whenever the temperature is higher than 40 degrees Celsius with a maximum delay of 15 minutes." The system needs to assess the delay for delivering the events of interest and verify if its value is below the desired value of 15 minutes. If the event delivery delay is not below minutes, then the system diagnoses a situation that requires adaptation. The adaptation policy to be triggered in this case would be "decrease delay". The strategy to implement such policy could be to activate more nodes so as to establish a smaller (and potentially faster) route from the data sources to the gateway, thereby decreasing the delay. On the other hand, the system monitors the residual energy of the nodes in order to assess (through a prediction model of energy kept in the database) whether the network will have energy enough to last for one month. If the system detects that the network with its current configuration will not meet this application requirement, then an adaptation is required. The adaptation policy to be triggered in this case would be "increase network lifetime." The strategy to implement such policy could be activating fewer nodes or decreasing the duty cycle of active nodes, provided that the remaining QoS requirements are met.

Integration of Data Prediction Models

The Prediction Manager 150 is used to predict or estimate the data which is requested by the application 130 using historical information acquired by WSNs and stored in the Knowledge Base 160.

Figure 6:
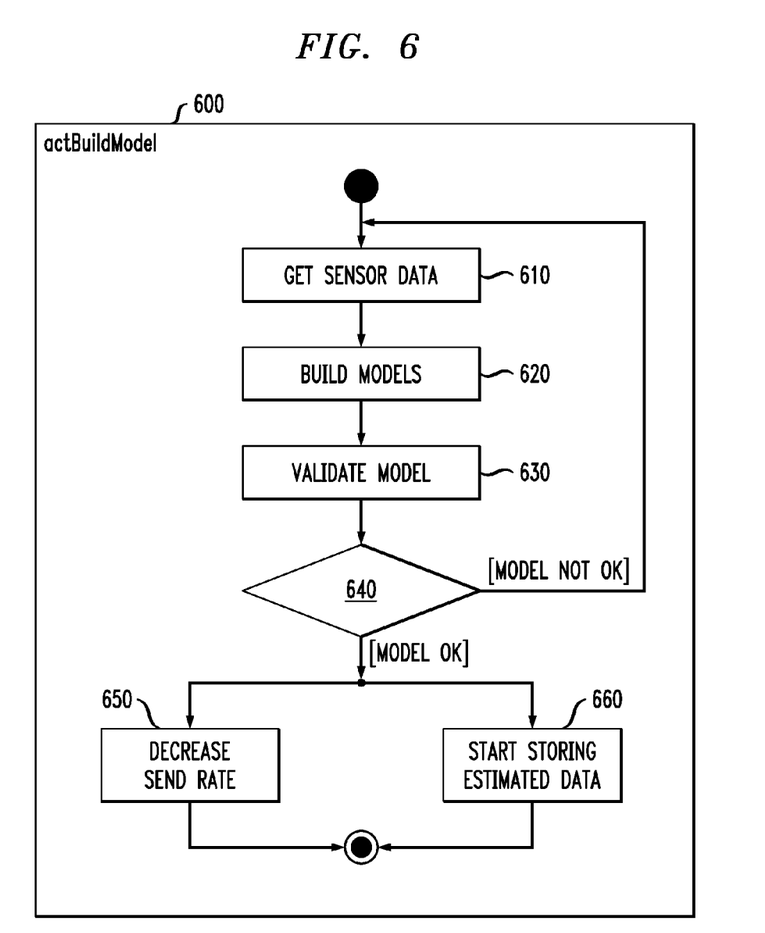
FIG. 6 is a flow chart illustrating an exemplary implementation of a build model process incorporating aspects of the present invention.

FIG. 6 is a flow chart illustrating an exemplary implementation of a build model process 600 incorporating aspects of the present invention. Generally, the exemplary build model process 600 constructs, from sensed data, models/relationships using statistical modeling or machine learning algorithms that allow an estimation of the value of a variable from other value(s). In other words, the value of a sensor measurement is estimated using the measurements of another sensor or group of sensors. The models built by the exemplary build model process 600 can be used to estimate the data instead of performing a continuous sampling in the sensor field. In order to verify the accuracy of the model, actual data needs to be sensed from time to time.

As shown in FIG. 6, the exemplary build model process 600 initially obtains the sensor data during step 610 and builds one or more models during step 620. For example, if an application requests the average temperature of a certain area, and due to the disclosed semantic clustering process, it is expected that, in the same cluster, sensors measurements will have linear relationships. Thus, a linear regression technique can be applied to find models that allow good estimators to be constructed for the application needs using only a small number of sensors. See, for example, William W. Hines and Douglas C. Montgomery, Probability and Statistics in Engineering and Management Science (John Wiley & Sons) and/or James D. Hamilton, Time Series Analysis, Princeton University Press, each incorporated by reference herein.

The model(s) built during step 620 are then validated during step 630.

A test is performed during step 640 to determine if the current model is OK. If it is determined during step 640 that the current model is not OK, then program control returns to step 610 to build a new model. If, however, it is determined during step 640 that the model is OK, then the send rate is decreased during step 650 and the estimated data is stored during step 660.

Figure 7:
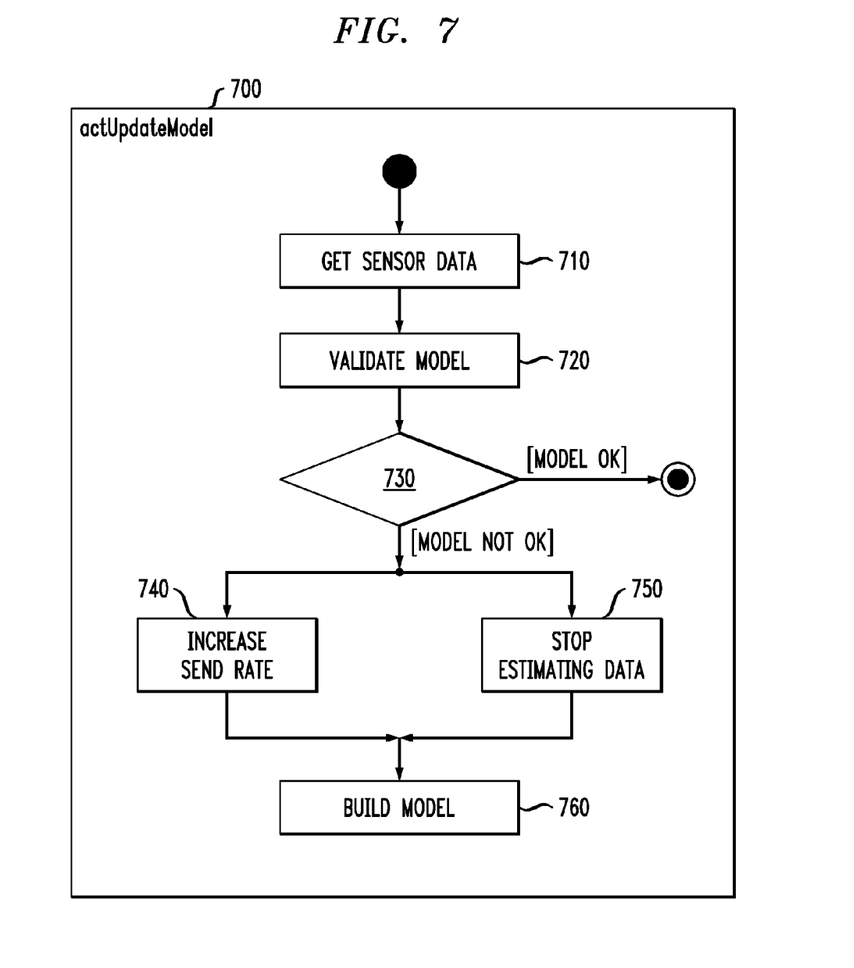
FIG. 7 is a flow chart illustrating an exemplary implementation of an update model process incorporating aspects of the present invention.

Whenever the requested data accuracy is not satisfied, the model is updated to meet the new dynamics of the observed phenomenon. FIG. 7 is a flow chart illustrating an exemplary implementation of an update model process 700 incorporating aspects of the present invention. Generally, the exemplary update model process 700 performs substantially continuous verification/update of the models and allows energy saving and also improves network availability since the system can answer queries even when some part of the data is missing.

As shown in FIG. 7, the exemplary update model process 700 initially obtains the sensor data during step 710 and validates the model during step 720. A test is performed during step 730 to determine if the model is OK. If it is determined during step 730 that the model is OK, then the exemplary update model process 700 terminates. If, however, it is determined during step 730 that the model is not OK, then the send rate is increased during step 740 and the process stops estimating data during step 750. A new model is built during step 760 using the Build Model process 600 (FIG. 6).

For example, if it is detected that the delivered quality is above a specified error threshold, the system changes the network parameter, by increasing the number of active data and/or the data sensing/sending rates.

The models disclosed herein using the sensed data available in the Knowledge Base 160 allow the current data to be extrapolated to provide data for the future with some associated error, which means the system can answer questions, such as "What will be the room temperature in one hour?"

Figure 8:
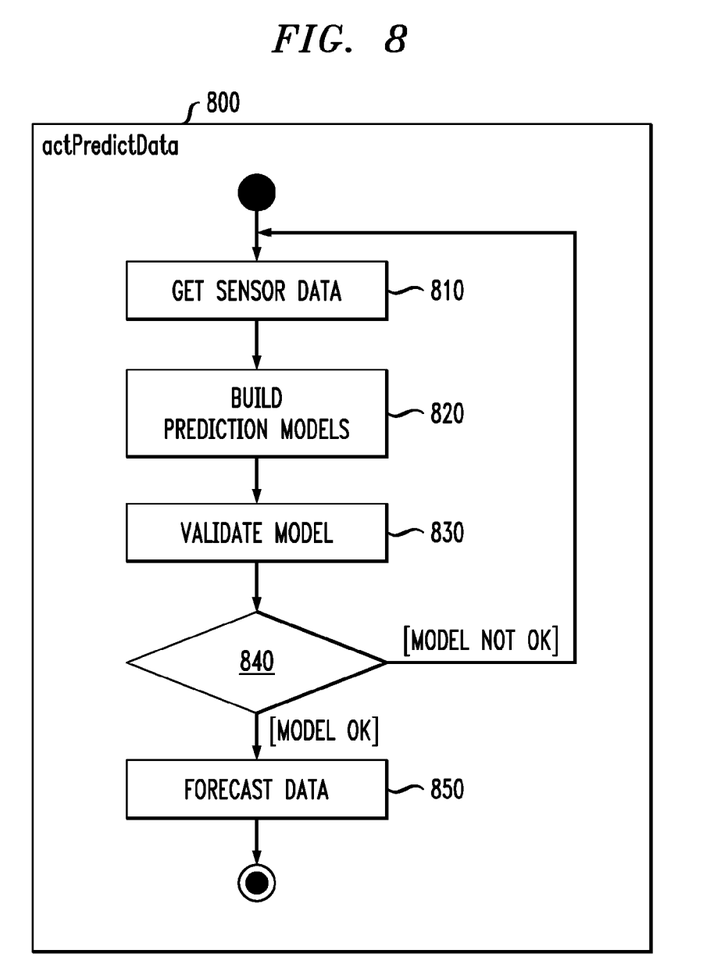
FIG. 8 is a flow chart illustrating an exemplary implementation of a data prediction process incorporating aspects of the present invention.

FIG. 8 is a flow chart illustrating an exemplary implementation of a data prediction process 800 incorporating aspects of the present invention. Generally the exemplary data prediction process 800 builds and validates prediction models in a similar manner to the build model process 600 of FIG. 6 and employs the validated prediction models to forecast data.

As shown in FIG. 8, the exemplary data prediction process 800 initially obtains the sensor data during step 810 and builds one or more prediction models during step 820. The model(s) built during step 820 are then validated during step 830.

A test is performed during step 840 to determine if the current prediction model is OK. If it is determined during step 840 that the current prediction model is not OK, then program control returns to step 810 to build a new prediction model. If, however, it is determined during step 840 that the model is OK, then the validated prediction models forecast data during step 850. Program control then terminates.

Figure 9:
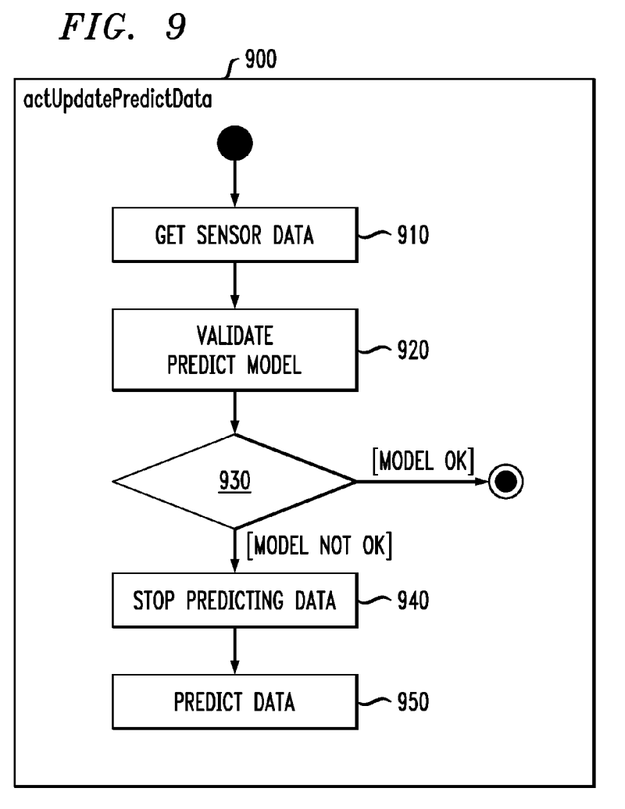
FIG. 9 is a flow chart illustrating an exemplary implementation of an update/verify prediction model process incorporating aspects of the present invention.

FIG. 9 is a flow chart illustrating an exemplary implementation of an update/verify prediction model process 900 incorporating aspects of the present invention. Generally, the exemplary update/verify prediction model process 900 performs substantially continuous verification/update of the prediction models and stops the prediction of data when the prediction model does not satisfy one or more predefined conditions. As noted above, the prediction models need to have their accuracy verified, so every time the Knowledge Base 160 has new actual data, the actual and the predicted value will be compared and if the accuracy is not satisfied, the prediction model will be re-estimated.

As shown in FIG. 9, the exemplary update/verify prediction model process 900 initially obtains the sensor data during step 910 and validates the prediction model during step 920. A test is performed during step 930 to determine if the prediction model is OK. If it is determined during step 930 that the prediction model is OK, then the exemplary update/verify prediction model process 900 terminates. If, however, it is determined during step 930 that the prediction model is not OK, then the exemplary update/verify prediction model process 900 stops predicting data during step 940. The prediction model is updated and used during step 950 using the Predict Data process 800 (FIG. 8).

The Prediction Manager 150 is thus used for the prediction/estimation of the variables monitored by applications. In addition, the Prediction Manager 150 is also used by the Analyzer and Planner modules 332, 336 during the adaptation of the network, in order to estimate the battery lifetime of the nodes (this is important for the process of selecting active nodes; see FIG. 4).

In an implementation that does not include the Prediction Manager 150, data can be sent to the application 130 that was collected by sensors 180, with a delay less or equal than the maximum delay set by the application. In the event of network or sensor failures, however, the application 130 will not receive any information until the fault is corrected, or if the application 130 needs to forecast any of the monitored data it will not be possible.

Aspects of the present invention are described herein with reference to flowchart illustrations and/or block diagrams of methods, apparatus (systems) and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As further described herein, such computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a computer to carry out techniques described herein. An article of manufacture, a computer program product or a computer readable storage medium, as used herein, is not to be construed as being transitory signals, such as electromagnetic waves.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should be noted that the functions noted in the block may occur out of the order noted in the figures.

Accordingly, the techniques described herein can include providing a system, wherein the system includes distinct software modules, each being embodied on a tangible computer-readable recordable storage medium (for example, all modules embodied on the same medium, or each modules embodied on a different medium). The modules can run, for example, on a hardware processor, and the techniques detailed herein can be carried out using the distinct software modules of the system executing on a hardware processor.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may all generally be referred to herein as a "module" or "system."

An aspect of the invention or elements thereof can be implemented in the form of an apparatus including a memory and at least one processor that is coupled to the memory and operative to perform the techniques detailed herein. Also, as described herein, aspects of the present invention may take the form of a computer program product embodied in a computer readable medium having computer readable program code embodied thereon.

Figure 10:
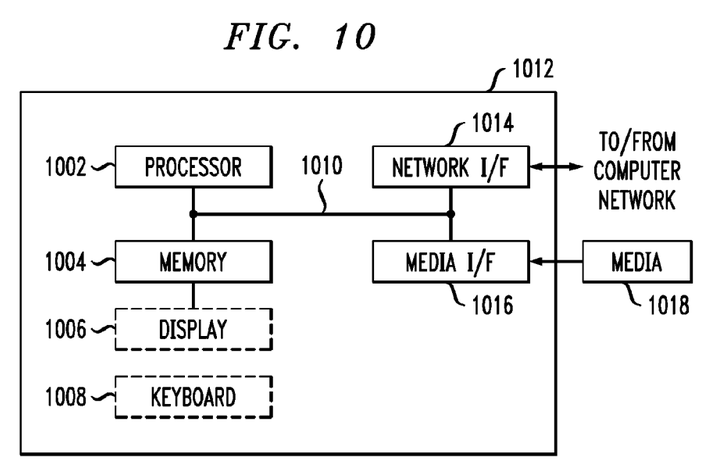
FIG. 10 is a system diagram of an exemplary computer system on which at least one embodiment of the invention can be implemented.

By way of example, an aspect of the present invention can make use of software running on a general purpose computer. FIG. 10 is a system diagram of an exemplary computer system on which at least one embodiment of the invention can be implemented. As depicted in FIG. 10, an example implementation employs, for example, a processor 1002, a memory 1004, and an input/output interface formed, for example, by a display 1006 and a keyboard 1008. The term "processor" as used herein includes any processing device(s), such as, for example, one that includes a central processing unit (CPU) and/or other forms of processing circuitry. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a mouse) and a mechanism for providing results associated with the processing unit (for example, a printer).

The processor 1002, memory 1004, and input/output interface such as display 1006 and keyboard 1008 can be interconnected, for example, via bus 1010 as part of a data processing unit 1012. Suitable interconnections via bus 1010, can also be provided to a network interface 1014 (such as a network card), which can be provided to interface with a computer network, and to a media interface 1016 (such as a diskette or compact disc read-only memory (CD-ROM) drive), which can be provided to interface with media 1018.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 1002 coupled directly or indirectly to memory elements 1004 through a system bus 1010. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 1008, displays 1006, and pointing devices, can be coupled to the system either directly (such as via bus 1010) or through intervening I/O controllers.

Network adapters such as network interface 1014 (for example, a modem, a cable modem or an Ethernet card) can also be coupled to the system to enable the data processing system to become coupled to other data processing systems or remote printers or storage devices through intervening private or public networks.

As used herein, a "server" includes a physical data processing system (such as system 1012 as depicted in FIG. 10) running a server program. It will be understood that such a physical server may or may not include a display and keyboard.

As noted, at least one embodiment of the invention can take the form of a computer program product embodied in a computer readable medium having computer readable program code embodied thereon. As will be appreciated, any combination of computer readable media may be utilized. The computer readable medium can include a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Examples include an electrical connection having one or more wires, a portable computer diskette, a hard disk, RAM, ROM, an erasable programmable read-only memory (EPROM), flash memory, an optical fiber, a portable CD-ROM, an optical storage device, a magnetic storage device, and/or any suitable combination of the foregoing. More generally, a computer readable storage medium may be any tangible medium that can contain, or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electromagnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing. Computer program code for carrying out operations in accordance with one or more embodiments of the invention can be written in any combination of at least one programming language, including an object oriented programming language, and conventional procedural programming languages. The program code may execute entirely on a user's computer, partly on a user's computer, as a stand-alone software package, partly on a users computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit(s) (ASICS), functional circuitry, an appropriately programmed general purpose digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, integers, steps, operations, elements, and/or components, but do not preclude the presence or addition of another feature, integer, step, operation, element, component, and/or group thereof. Additionally, the corresponding structures, materials, acts, and equivalents of all means or step plus function elements in the claims are intended to include any structure, material, or act for performing the function in combination with other claimed elements as specifically claimed.

Also, it should again be emphasized that the above-described embodiments of the invention are presented for purposes of illustration only. Many variations and other alternative embodiments may be used. For example, the techniques are applicable to a wide variety of other types of communication systems, storage systems and processing devices that can benefit from improved management of sensor data. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method for managing at least one sensor network comprised of a plurality of sensors, said method comprising:
   obtaining measurement data and context data from said plurality of sensors;
   storing said obtained measurement data and context data using a Massively Parallel Processing Database Management System; and managing said at least one sensor network from outside of said at least one sensor network using said Massively Parallel Processing Database Management System, wherein said step of managing said at least one sensor network comprises a context-aware adaptation of one or more sensors in said at least one sensor network based on individual requirements of a plurality of applications, wherein said step of managing said at least one sensor network comprises evaluating a data quality of said obtained measurement data relative to one or more predefined percentages of error and adjusting, based on said evaluated data quality, one or more of a number of active sensors, a measurement sensing rate and a measurement sending rate.

2. The method of claim 1, wherein said sensor networks comprises one or more of wireless and wired sensors.

3. The method of claim 1, wherein said context-aware adaptation of said one or more sensors in said at least one sensor network is further based on context regarding a state of the at least one sensor network and context regarding a state of the plurality of applications.

4. The method of claim 1, wherein said step of managing said at least one sensor network comprises adjusting a behavior of one or more elements of said at least one sensor network.

5. The method of claim 1, further comprising the step of providing a sensor manager component to interact with said plurality of sensors and configure the plurality of sensors according to required sensing tasks and one or more quality of service parameters.

6. The method of claim 5, wherein said sensor manager component receives measurement data and context data from said plurality of sensors.

7. The method of claim 6, wherein said measurement data and said context data are stored in said Massively Parallel Processing Database Management System.

8. The method of claim 1, further comprising the step of providing a drivers sensor manager comprising a plurality of drivers for different sensor platforms to enable communication with a plurality of said sensor networks.

9. The method of claim 1, further comprising the step of providing a configuration manager for receiving configuration commands for said sensor nodes and sending such commands to an integration manager that integrates said plurality of said sensor networks.

10. The method of claim 1, further comprising the step of providing an adaptation manager that scans said Massively Parallel Processing Database Management System to extract current context information of one or more of said sensor network and one or more applications and generate an adaptation event indicating one or more adaptation actions to be taken when adaptation is required.

11. The method of claim 1, further comprising the steps of clustering said plurality of sensor nodes based on semantic similarities among sensor readings from said different sensor nodes and a distance among the sensor nodes and adjusting, based on said clustering, one or more of an amount of measurement data that is transmitted, and a subset of selected sensors that represent data samples for a given region.

12. The method of claim 1, further comprising the step of selecting a subset of said sensor nodes to be active based on a residual energy of said sensor nodes and a relevance of said sensor nodes to at least one application.

13. The method of claim 1, further comprising the step of generating one or more data prediction models.

14. The method of claim 13, wherein said one or more data prediction models allow one or more of: obtaining sensing data with a reduced number of sensors, processing one or more queries when a portion of the sensed data is unavailable and extrapolating current data to predict future data.

15. The method of claim 13, further comprising the step of validating said one or more data prediction models.

16. A computer program product comprising at least one non-transitory machine-readable storage medium for storing an architectural design, said architectural design comprising an intangible set of components and their connections, wherein said intangible set of components are transformed into one or more software programs which, when executed, perform the steps of the method of claim 1.

17. A computer program product comprising a non-transitory machine-readable storage medium having encoded therein executable code of one or more software programs, wherein the one or more software programs when executed perform the steps of the method of claim 1.

18. The computer program product of claim 17, wherein said one or more software programs implement the architectural design of claim 16.

19. A system for managing at least one sensor network comprised of a plurality of sensors, comprising:
a memory; and
at least one hardware device, coupled to the memory, operative to implement the following steps:
obtaining measurement data and context data from said plurality of sensors;
storing said obtained measurement data and context data using a Massively Parallel Processing Database Management System; and
managing said at least one sensor network from outside of said at least one sensor network using said Massively Parallel Processing Database Management System, wherein said step of managing said at least one sensor network comprises a context-aware adaptation of one or more sensors in said at least one sensor network based on individual requirements of a plurality of applications, wherein said at least one sensor network is managed by adjusting a behavior of one or more elements of said at least one sensor network, evaluating a data quality of said obtained measurement data relative to one or more predefined percentages of error and adjusting, based on said evaluated data quality, one or more of a number of active sensors, a measurement sensing rate and a measurement sending rate.

20. The system of claim 19, wherein said context-aware adaptation of said one or more sensors in said at least one sensor network is further based on context regarding a state of the at least one sensor network and context regarding a state of the plurality of applications.

21. The system of claim 19, further comprising a sensor manager component to interact with said plurality of sensors and configure the plurality of sensors according to required sensing tasks and one or more quality of service parameters, wherein said sensor manager component receives measurement data and context data from said plurality of sensors for storage in said Massively Parallel Processing Database Management System.

22. The system of claim 19, further comprising a drivers sensor manager comprising a plurality of drivers for different sensor platforms to enable communication with a plurality of said sensor networks.

23. The system of claim 19, further comprising a configuration manager for receiving configuration commands for said sensor nodes and sending such commands to an integration manager that integrates said plurality of said sensor networks.

24. The system of claim 19, further comprising an adaptation manager that scans said Massively Parallel Processing Database Management System to extract current context information of one or more of said sensor network and one or more applications and generate an adaptation event indicating one or more adaptation actions to be taken when adaptation is required.

25. The system of claim 19, wherein one or more data prediction models allow one or more of obtaining sensing data with a reduced number of sensors, processing one or more queries when a portion of the sensed data is unavailable and extrapolating current data to predict future data.

* * * * *

UNITED STATES PATENT AND TRADEMARK OFFICE
CERTIFICATE OF CORRECTION

PATENT NO. : 9,491,060 B1  
APPLICATION NO. : 14/318806  
DATED : November 8, 2016  
INVENTOR(S) : Oliveira et al.

Page 1 of 1

It is certified that error appears in the above-identified patent and that said Letters Patent is hereby corrected as shown below:

In the Abstract, Line 14, replace "sensor .nodes." with --sensor nodes.--.

Column 3, Line 56, replace "false positives readings" with --false positive readings--.

Column 7, Line 24, replace "Sensor Manager 370 component" with --Sensor Manager component 370--.

Column 11, Line 14, replace ""decrease delay"." with --"decrease delay."--.

Column 11, Lines 57-59, replace "Douglas C. Montgomery, Probability and Statistics in Engineering and Management Science (John Wiley & Sons)" with --Douglas C. Montgomery, "Probability and Statistics in Engineering and Management Science," (John Wiley & Sons)--.

Column 11, Lines 59-60, replace "Jamed D. Hamilton, Time Series Analysis, Princeton University Press," with --Jamed D. Hamilton, "Time Series Analysis," Princeton University Press,--.

Signed and Sealed this  
Second Day of May, 2017

Michelle K. Lee  
*Director of the United States Patent and Trademark Office*